March 14, 1961 K. T. SNOW 2,974,465
CORN PICKER

Filed Dec. 18, 1958 3 Sheets-Sheet 3

Inventor:
Kenneth T. Snow
By Paul O. Pippel
Atty.

United States Patent Office 2,974,465
Patented Mar. 14, 1961

2,974,465
CORN PICKER

Kenneth T. Snow, Wheaton, Ill., assignor to International Harvester Company, Chicago, Ill., a corporation of New Jersey Filed Dec. 18, 1958, Ser. No. 781,286

3 Claims. (Cl. 56—18)

This invention relates to a new and improved corn picker.

To accomplish picking of corn by field traversing equipment requires a machine which is capable of retaining almost all of the corn picked and is capable of efficiently separating corn from the trash which enters the machine simultaneously with the picking of the corn. Many present-day corn pickers employ picking units at the forward ends of the machines and clean corn hoppers or receptacles disposed generally at the rearward end of the machines. The forward picking portions of the corn pickers are usually arranged to tilt through a vertical arc to accomplish picking at various levels and/or to provide for the transporting of the corn picker. In contradistinction the receiving hoppers are generally fixedly disposed relative to the vehicle frame and hence it is an important phase of the harvesting operation to deliver harvested and cleaned corn to the hopper without losing any corn and to simultaneously discharge trash or other waste matter preferably rearwardly over the receiving hopper so that the trash is completely separated from the clean corn and delivered to the receiving hopper.

A principal object of this invention is to provide means for delivering harvested corn from a picking unit to a receiving hopper.

Another important object of this invention is the provision of means in a corn picker for carrying harvested corn from an arcuately adjustable corn picking unit to a relatively stationary receiving hopper by a housing member affixed to said receiving hopper and having an articulated joint between the corn picking unit and the housing.

Still another important object of this invention is to supply a tubular housing mounted in a fixed position over a corn receiving hopper on a corn picker and having its forward end arranged and constructed in an articulated joint with an arcuately adjustable corn picking unit mounted forwardly thereof.

Another and still further important object of this invention is to equip a corn picker with a generally tubular housing in a fixed position over a corn receiving hopper and having means for accomplishing relative shifting movement of a corn picking unit relative thereto and arranged and constructed with trash removing rolls at its ends over the receiving hopper to thereupon discharge trash rearwardly over the hopper and at the same time drop harvested clean corn into the hopper for subsequent delivery to a trailing depositary or the like.

Other and further important objects and advantages will become apparent from the disclosures in the following specification and accompanying drawings:

Figure 2:
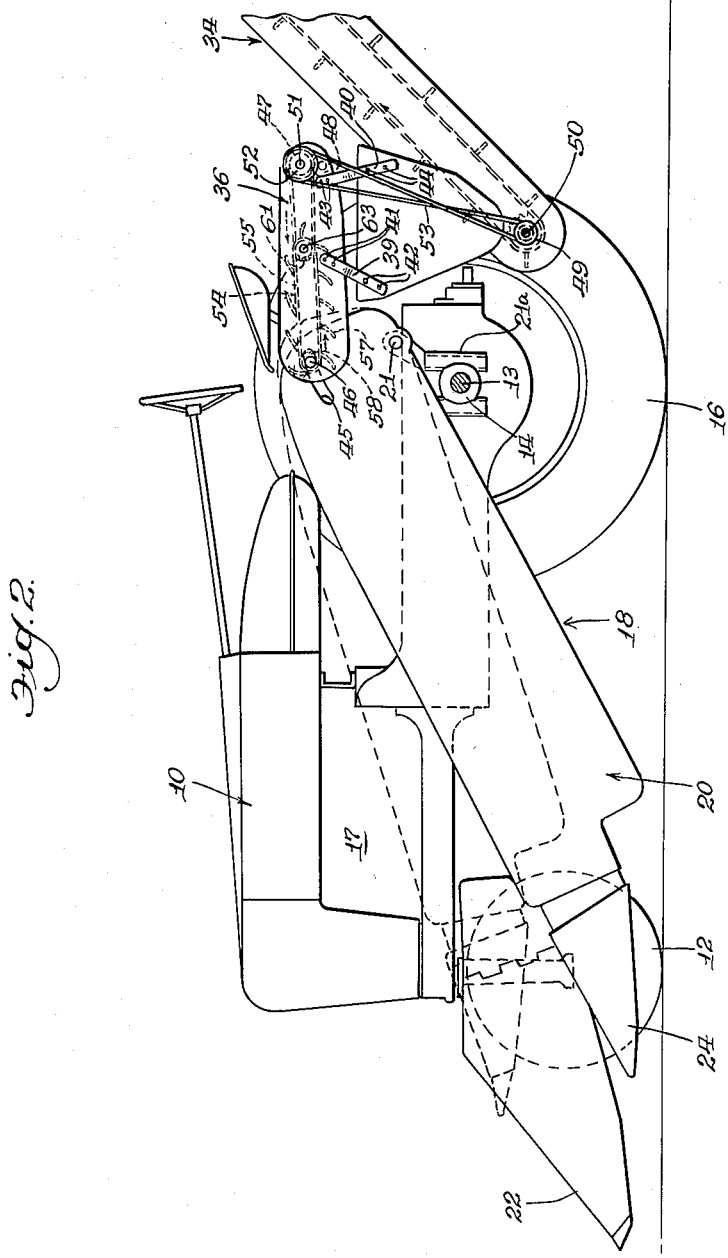
Figure 2 is a side elevational view of the device as shown in Figure 1.

As shown in the drawings the reference numeral 10 indicates generally an agricultural type tractor having a longitudinally extending chassis or frame 11 which as shown in Figure 2 is supported at its front end by steerable wheels 12. The rear portion of the longitudinal and elongated chassis 11 is provided with transversely disposed axles 13 carried in a housing 14. Large traction wheels 15 and 16 are mounted on the axles 13 and thus support the rear of the tractor and supply the ground-engaging traction for the vehicle. The forward portion of the tractor 10 has a generally elongated engine 17 which is disposed over and constitutes a part of the longitudinal frame or chassis 11. The corn picker mounted on the tractor 10 shall be generally designated as 18. The picker includes spaced apart corn gathering or picking units 19 and 20. As best shown in Figure 2 picking unit 20 is pivotally mounted at 21 on bracket structure 21a fixedly mounted with respect to the axle housing 14.

Figure 1:
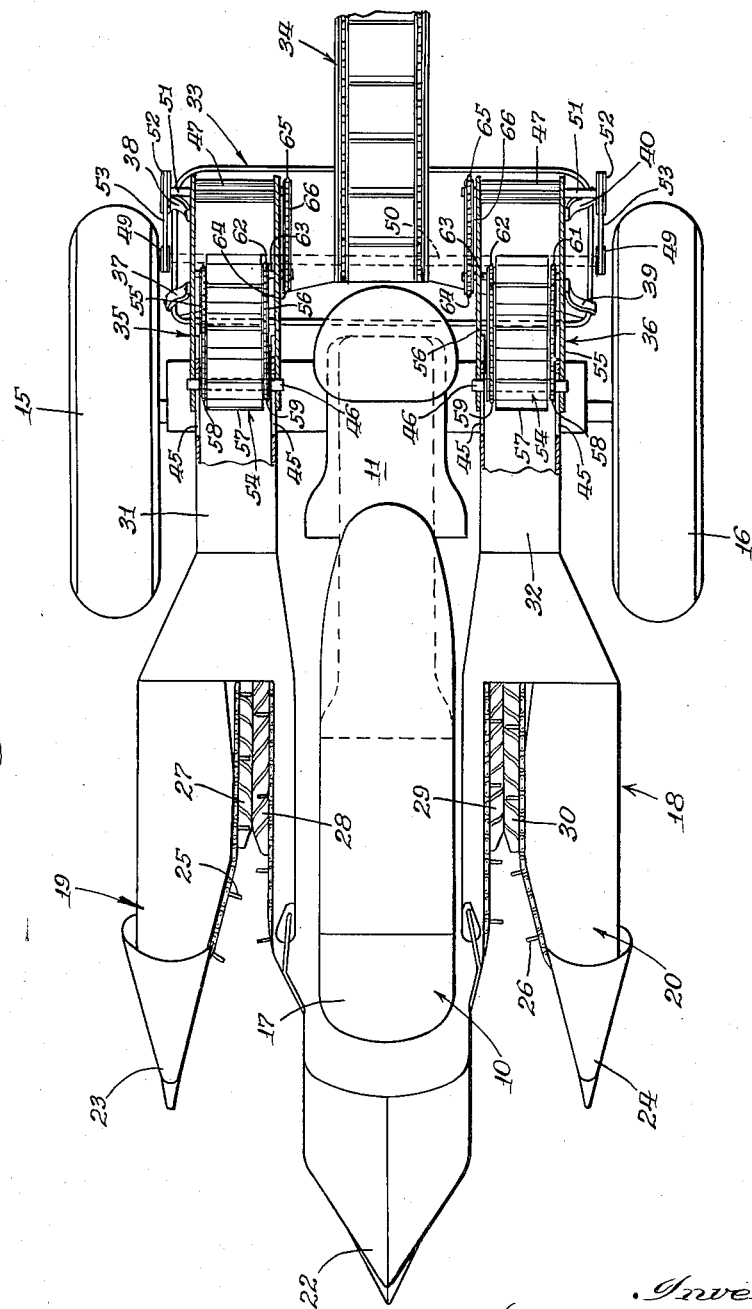
Figure 1 is a top plan veiw of the tractor mounted corn picker of this invention.

As shown in Figure 1 the corn picker is equipped with a center divider 22 which acts to guide the corn stalks either into one gathering unit or the other. The gathering unit 19 is provided with an outside divider point 23 and similarly the gethering unit 20 is provided with an outside gathering point 24. Thus the corn in one row passes between the center divider 22 and the outer gathering point 23 and thence into the corn picking unit 19. On the other side of the machine the row of corn passes between the center divider 22 and the outer gathering point 24 and thence into the corn picking unit 20. The detail construction of the corn picking units 19 and 20 has not been shown. However, in order to better depict the functions of each of these units there has been shown gathering chains 25 and 26 to cause the stalks to be moved rearwardly into engagement with cooperative snapping rolls 27 and 28 in the unit 19, and 29 and 30 in the unit 20. The cooperative snapping rolls 27 and 28 and 29 and 30 are rotated inwardly and downwardly causing the corn bearing stalks to be pulled downwardly therebetween. When the stalks are pulled downwardly to the point of junction with the ears hanging thereon, the ears are caused to be snapped or stripped from the stalks and the gathering chains 25 and 26 move the snapped ears of corn upwardly and rearwardly through housing portions 31 and 32 in the picking units 19 and 20 respectively.

A corn receiving hopper 33 is fixedly mounted relative to the tractor behind the rear axle housing 14. The function of the hopper 33 is to receive corn picked from the field by the corn picking units 19 and 20 and severed from the stalks by the snapping rolls. Following delivery of the corn to the receiving hopper 33 the ears fall inwardly toward the center of the hopper and into a wagon elevator 34 which is arranged and constructed to carry the ears of corn upwardly and rearwardly for discharge into a trailing wagon (not shown).

Figure 3:
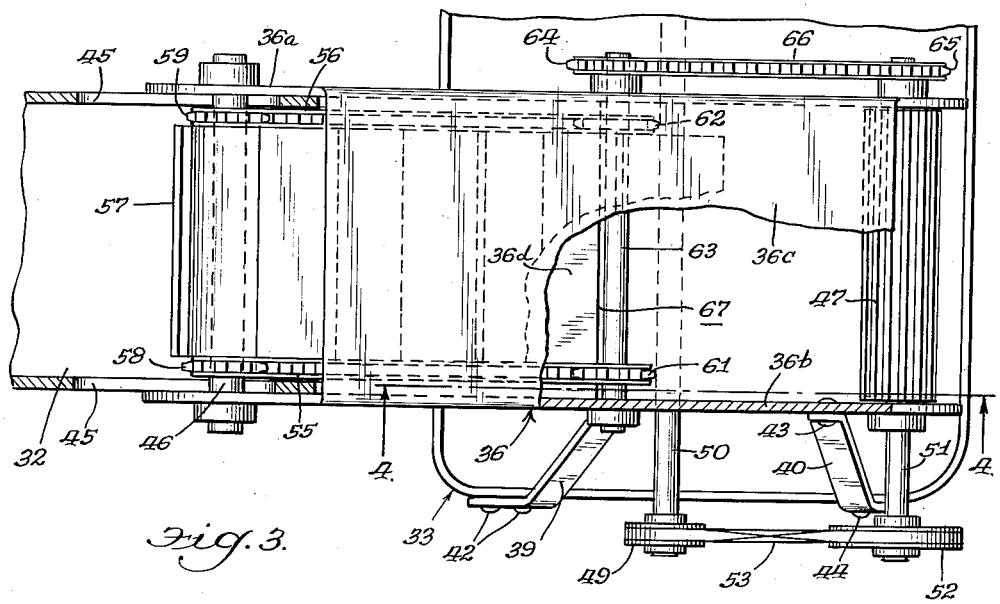
Figure 3 is an enlarged top plan view, partially in section, of the tubular housing between the corn picking unit and the corn receiving hopper.
Figure 4:
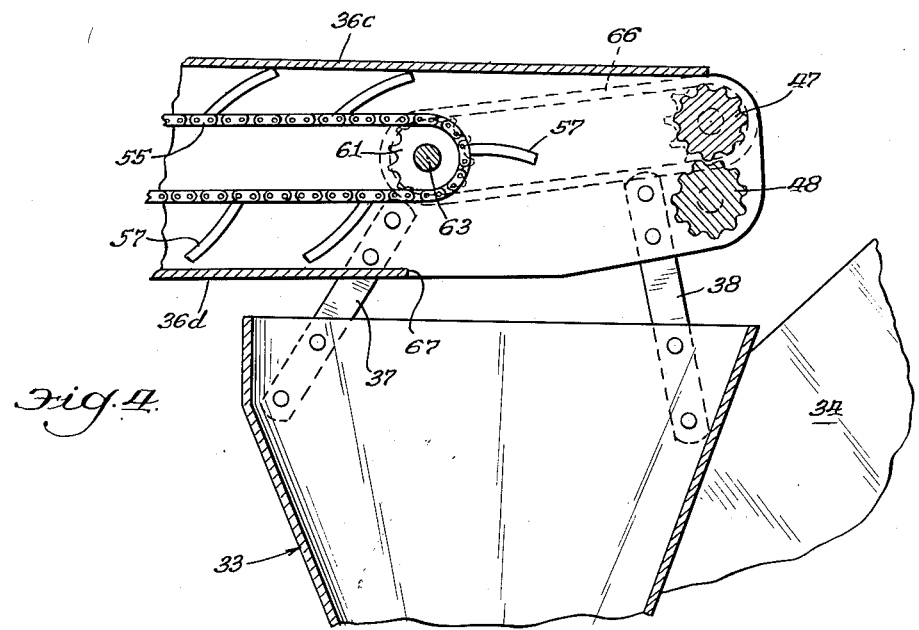
Figure 4 is a sectional view taken on the line 4—4 of Figure 3.

The upper rearward ends of the corn picking and gathering units 19 and 20 are provided with generally tubular housing members 35 and 36 which constitute extensions of the housing portions 31 and 32. These tubular housing extensions are affixed to the corn receiving hopper 33 by brackets 37 and 38 for the tubular housing member 35 and brackets 39 and 40 for the tubular housing member 36. The housings 35 and 36 have horizontally spaced apart side members and vertically spaced apart top and bottom members. For a more detailed showing of the tubular housing 36 attention is directed to Figures 3 and 4 wherein the horizontally spaced apart side walls are shown at 36a and 36b and the vertically spaced apart top and bottom members are shown at 36c and 36d respectively. It should, of course, be understood that the tops are not essential except for shielding and the bottoms confine the harvested crop to a position within the tubular housings to a point where the corn is dropped into the receiving hopper and the trash is removed over the end of the hopper. As best shown in Figures 2, 3 and 4 the tubular housing 36 is disposed in fixed position over the receiving hopper 33 in a relatively advantageous position for depositing ears of corn directly downwardly from the tubular housing into the hopper. The end of the tubular housing 36 is also disposed at a position approximately over the rear wall of the corn receiving hopper 33 in such a manner that trash being discharged through the end of the tubular housing 36 will be deposited over the hopper and onto the ground for complete separation of corn and trash. The bracket member 39 is riveted at 41 to the side 36b of the tubular housing 36 and is riveted at 42 to a substantially forward portion of the corn receiving hopper 33. Similarly the upper portion of the connecting bracket 40 is riveted at 43 to a rearward portion of the side 36b of the tubular housing 36 and the lower end thereof is riveted at 44 to a substantially rearward portion of the receiving hopper 33. These brackets 39 and 40 are rigid members which fixedly hold the tubular housing 36 in fixed position over the corn receiving hopper 33. In this manner there is no relative movement between the delivery housing 36 and the receiving hopper 33 which may change and therefore the fixed positioning is arranged and constructed for maximum efficiency of delivery of corn to the hopper and trash over and beyond the end of the hopper.

The forward end of the tubular housings 35 and 36 are equipped with articulated joints for attachment to the corn gathering units 19 and 20 respectively. As best shown in Figures 2 and 3 the side of the upper end 32 of the gathering unit 20 is provided with an elongated arcuate slot 45 formed substantially about the pivotal axis 21 of the gathering unit 20 as a center. A shaft 46 is journaled in the spaced apart side sheets 36a and 36b of the tubular housing 36 and projects through the slots 45. Now when the gathering unit 20 is arcuately adjusted about its center 21 the arcuate slot 45 moves around the shaft 46 on the stationary tubular housing 36 thus providing for a flexible joint between the elements 20 and 36 and yet providing for a general continuity of enclosed housing through which the corn and trash material may pass rearwardly for delivery to the hopper and over the hopper respectively. The articulated joint designated by the elements 45 and 46 on the tubular housing 36 is repeated on the tubular housing 35 on the other side of the machine.

Trash removing rolls 47 and 48 are shown journally mounted on and within the discharging rearward end of the tubular housing 36 to provide for the removal of trash rearwardly over the back of the corn receiving hopper 33. The driving means for effecting rotation of the trash removing rolls 47 and 48 although not essentially forming a part of the present invention may be accomplished by adding a V-pulley 49 to the driven shaft 50 of the wagon elevator 34. A shaft 51 extends outwardly from the upper roll 47 and is equipped with a V-pulley 52 in planar alignment with the sprocket 49. A crossed V-belt 53 joins the aligned V-pulleys 49 and 52 and thus rotational drive is carried from the wagon elevator drive to the trash removing rolls. Although only one side of the corn picker has been described in detail it should be understood that the parts are symmetrical about a longitudinal center line and the trash removing rolls and the drive therefor for the tubular housing 35 is identical to that shown and described for the tubular housing 36.

In order to further facilitate the movement of corn and trash material rearwardly in the tubular housings 35 and 36 there is shown in all of Figures 1, 2, 3 and 4 a conveyor mechanism 54 which includes spaced apart chains 55 and 56 with adjoining cross slats 57. The chains 55 and 56 are mounted on sprockets 58 and 59 on the shaft 46 at the forward end thereof and on sprockets 61 and 62 on the shaft 63 at the rearward end thereof. A sprocket 64 is mounted on an extension of the shaft 63 and a sprocket 65 is mounted on the shaft 51 in planar alignment with the sprocket 64 whereby a chain 66 joining the sprockets 64 and 65 imparts rotational drive from the trash removing rolls to the shaft 63 and thus to the slatted chain conveyor 54. It should be noted that the conveyor 54 stops short of the end of the tubular housing 36 and permits the ear corn to drop through an opening 67 in the bottom thereof directly into the receiving hopper 33 as previously described. Also the trash in the tubular housing 36 tends to be moved over this opening in the bottom because of its longer length and/or its lightness in weight. The trash is then grasped by the cooperative trash removing rolls 47 and 48 whereupon it is moved outwardly over the rear of the hopper for discharge onto the ground.

In the operation of the device of this invention the implement which is preferably mounted on a tractor as shown in the drawings traverses a field of standing corn whereupon the corn is stripped by the corn picking units and the snapping rolls effect a stripping or snapping of the ears from the stalks and deliver the snapped ears and possibly some trash, including broken stalks and leaves or the like, upwardly and rearwardly through the upper ends 31 and 32 of the picking units 19 and 20. Following passage of material through the upper ends 31 and 32 it passes thence to the fixed tubular housings 35 and 36 regardless of the angular adjusted position of the picking units 19 and 20 with regard to the carrying tractor. The corn material is moved rearwardly in the tubular housings 35 and 36 by any suitable conveyor means such as the conveyor mechanism 54, and the corn is dropped into the receiving hopper 33 whereupon it is aggregated and carried by the wagon elevator 34 to a trailing wagon or the like. The trash and other material that passes rearwardly through the tubular housings 35 and 36 is grasped by the cooperative rolls 47 and 48 and discharged therethrough to a position over the rearward edge of the receiving hopper 33 so that the corn and the trash are efficiently separated. The object of the fixed tubular housing 35 and 36 is to fixedly maintain a desirable position of discharge of corn and trash relative to the hopper 33 despite angular adjustments of the corn picking unit.

I am aware that numerous details of construction may be varied throughout a wide range without departing from the principles disclosed herein and I therefore do not propose limiting the patent granted hereon, otherwise than as necessitated by the appended claims.

What is claimed is:

1. In a corn picker of the type having a vertically adjustable corn picking unit, means to snap ears of corn from corn stalks in said corn picking unit, and a stationary ear corn receiving hopper disposed rearwardly of said corn picking unit, comprising a tubular housing, means fixedly mounting said tubular housing on said ear corn receiving hopper, said tubular housing having conveyor means for moving corn material therethrough, said tubular housing having an opening adjacent the rear thereof directly over the ear corn receiving hopper, and articulated joint means interposed between the forward end of the stationary tubular housing and the vertically adjustable corn picking unit whereby the discharge end of the tubular housing remains in fixed position over said ear corn receiving hopper, the articulated joint means including an arcuate elongated slot in the side of said vertically adjustable corn picking unit and a fixed stub shaft in the forward end of the tubular housing whereby the shaft projects into the arcuate slot and the corn picking unit may be vertically adjusted without separating from the tubular housing within the limits of the stub shaft within the arcuate slot.

2. In a field traversing corn picker of the type having a wheeled support, a corn gathering unit hingedly mounted on said wheeled support for generally vertical movement in an arcuate path about the hinge mounting, a corn receiving hopper affixed to the wheeled support rearwardly of the corn gathering unit, comprising a generally horizontally arranged tubular housing, said tubular housing affixed to and having a rearward portion thereof disposed over said corn receiving hopper, said tubular housing having an opening in its under side in register with the corn receiving hopper, said tubular housing having an opening in its under side in register with the corn receiving hopper, said tubular housing having an opening at its rearward end and located at the rear extremity of the corn receiving hopper, said tubular housing having a conveyor therein arranged to carry harvested material from the forward end of said tubular housing to the rearward end whereby corn may drop through and be deposited in said corn receiving hopper through the opening in the under side of said tubular housing in register with the receiving hopper, cooperative trash removing rolls rotatably driven in said tubular housing in the opening at its rearward end whereby trash material delivered to the rearward end of said tubular housing by said conveyor therein is removed from said tubular housing over the rear extremity of said corn receiving hopper, and means joining the discharge end of said corn gathering unit with the forward end of said tubular housing whereby harvested corn and including trash material is delivered from said gathering unit to said tubular housing.

3. A device as set forth in claim 2 in which the corn gathering unit is hinged at a spaced apart position from said means joining it to said tubular housing.

References Cited in the file of this patent

UNITED STATES PATENTS

| | | |
|---|---|---|
| 1,798,045 | Spangler | Mar. 24, 1931 |
| 2,015,708 | Carlson | Oct. 1, 1935 |
| 2,517,401 | Millard et al. | Aug. 1, 1950 |